United States Patent

[11] 3,599,935

[72] Inventor Dana Walker
Delray Beach, Fla.
[21] Appl. No. 832,802
[22] Filed June 12, 1969
[45] Patented Aug. 17, 1971
[73] Assignee Kay Sjostrom
Boca Raton, Fla.

[54] BELT PULLER
4 Claims, 2 Drawing Figs.

[52] U.S. Cl. .................................................. 254/52
[51] Int. Cl. .......................................... F16g 11/00
[50] Field of Search .......................................... 81/367-
—380, 303, 311, 5.1; 269/42; 254/52, 79, 80, 81;
29/268, 243.51

[56] References Cited
UNITED STATES PATENTS

| | | | |
|---|---|---|---|
| 954,001 | 4/1910 | Meiers | 254/52 |
| 1,051,759 | 1/1913 | Redding | 254/52 |
| 1,480,046 | 1/1924 | Carter | 254/52 |
| 1,568,355 | 1/1926 | Van Houweling | 254/52 |
| 2,815,728 | 12/1957 | Fenimore | 81/378 |

Primary Examiner—Robert C. Riordon
Assistant Examiner—Roscoe V. Parker
Attorney—Wolf, Greenfield & Sacks ABSTRACT: A belt puller for clamping together for interengagement adjacent free ends of elongated objects, such as industrial belting. A pair of clamps supported on movable arms engage these free ends and draw them together upon the squeezing of an interconnected hand clamp.

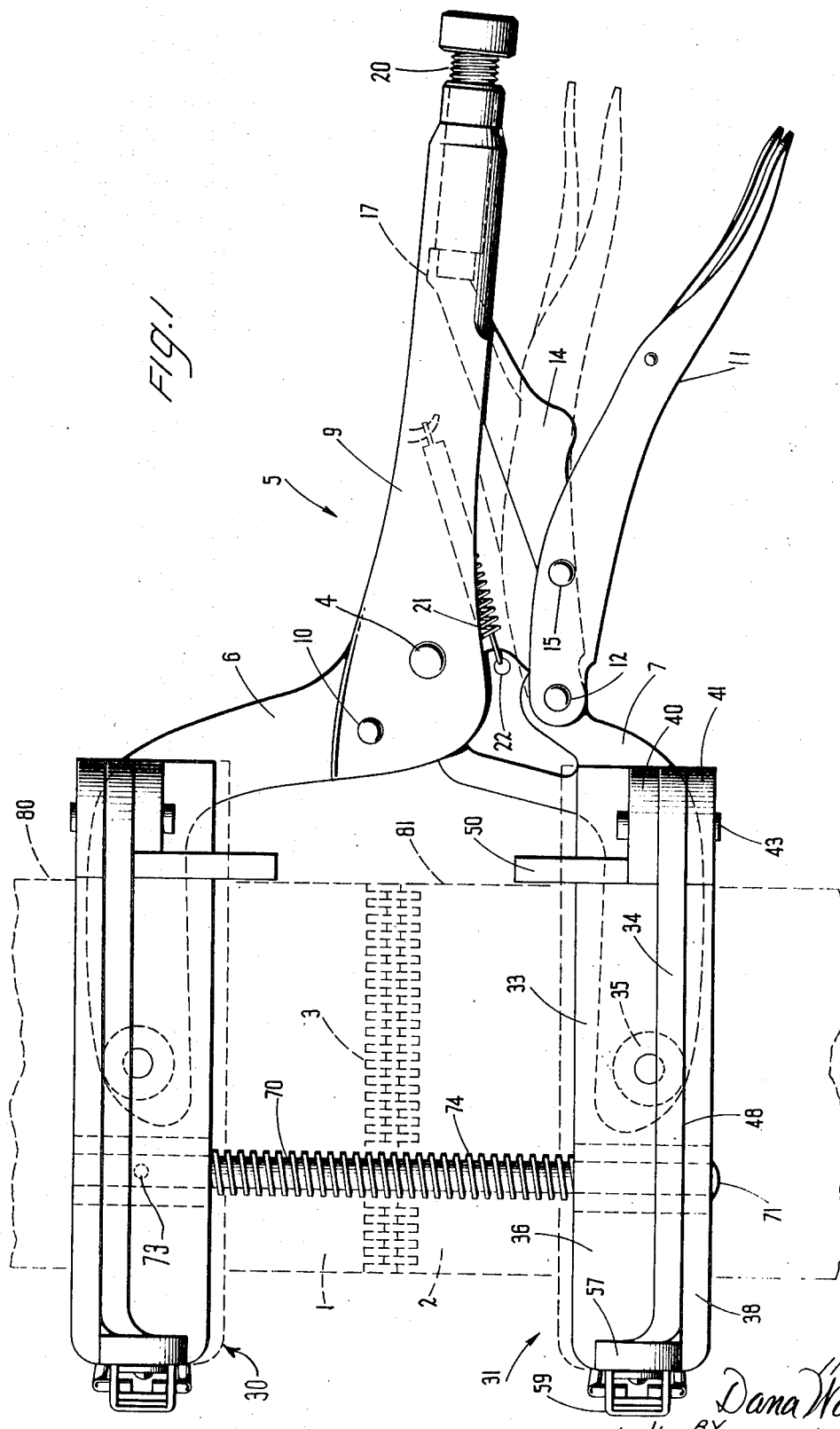

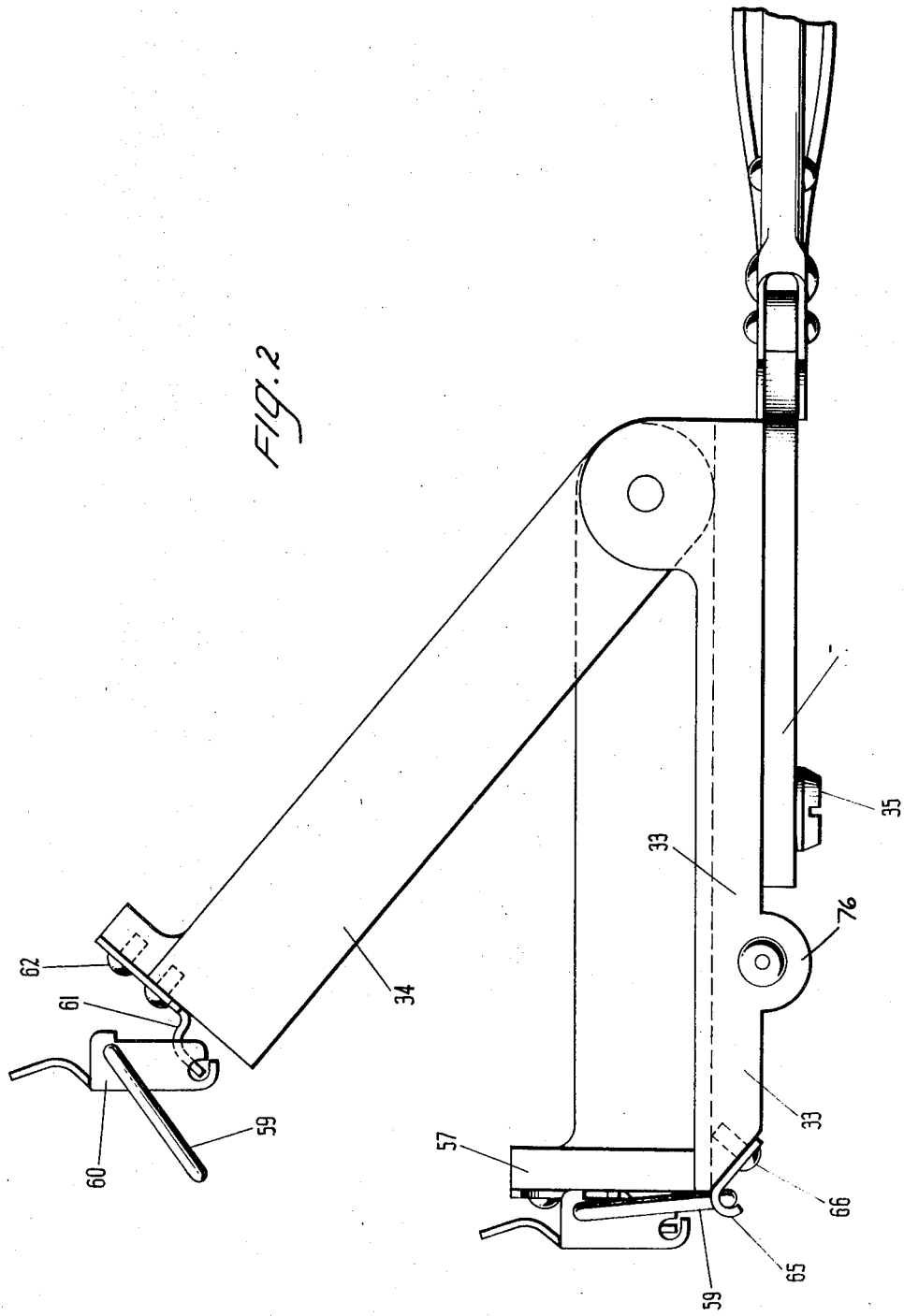

BELT PULLER

CROSS-REFERENCES TO RELATED PATENTS

The hand clamp utilized in the present invention is of conventional design and is disclosed, at least in part, in U.S. Pat. Nos. 2,641,149; 2,514,130; and 2,280,005.

BACKGROUND OF INVENTION

The present invention relates to a tool for making the free ends of the elongated objects and more particularly to tying together the ends of belts under tension to facilitate interengagement.

Many industrial machines use endless belts or webs for power transmission, conveyor purposes, and other similar applications. Typically, such belts or webs are formed to a definite length which is adapted to be tensioned around suitable rollers, pulleys, and the like; and when so tensioned, the free ends are locked together. Frequently, substantial tension is required; and as a consequence, it is often difficult to manually juxtapose the free ends of the belts for joining. Proper alignment also presents difficulties because of the belt tension and the precise nature of the necessary interlock which frequently consists of loops or lacings to be interleaved and secured by a pin or other joining element. Such alignment and tensioning frequently requires several men to exert considerable effort for a protracted period in order to join the free belt ends. The problems posed by these requirements are substantial, not only because expensive machine downtime frequently will be involved until the belt can be joined.

SUMMARY OF THE INVENTION

It is an object of the present invention to provide an improved tool for interconnecting the ends of laced belts and the like. A further object is to provide such a tool capable of gripping or clamping the ends of elongated objects such as belting or webbing and bringing them into aligned juxtaposition for interlocking. A further object is to provide a tool which may be operated by a single individual in a short time, which requires little strength or skill on the part of the operator, and which produces increased belt tension where required (thereby improving belt operation and minimizing loss of time for belt replacement and maintenance).

BRIEF DESCRIPTION OF DRAWINGS

FIG. 1 is a top plan view of a belt-pulling tool embodying the present invention; and FIG. 2 is a side elevational view in partial fragmentary form of the embodiment illustrated in FIG. 1.

DETAILED DESCRIPTION OF THE PREFERRED EMBODIMENT

Referring to the drawings, there is shown a tool for mating the free ends of a pair of elongated objects, for example, the free ends of a single industrial belt, which has been looped about rolls or the like. The free ends 1 and 2 are shown in dotted outline in FIG. 1. Frequently, such belts are interconnected by a pin passing through aligned wire loops affixed to the free ends (shown at 3). Because such belts are frequently required to operate under significant tension, it is obviously difficult to manually produce the required degree of tension for interconnection after mounting the belt on rolls or the like. This difficulty is, to a great extent, obviated by the tool shown.

In the embodiment illustrated, there is provided a pair of arms 6 and 7 mutually pivoted at 4. These arms may be operated by the high mechanical advantage hand clamp shown generally at 5. Squeezing handle 11 toward handle 9 causes arms 6 and 7 to rotate toward each other. Handle 9 is integrally interlocked with arm 6 by pin 10. Handle 11 is pivoted to arm 7 at pin 12. Pin 15 intermediate the ends of handle 121 pivotally secures lever 14 to handle 11. The opposite end 17 of lever 14 fits within handle 9 and engages the end of stop screw 20. Spring 21 is connected at 22 to arm 7 and is secured at its opposite end to handle 9, which may be of U-shaped cross section to receive this end of the spring and end 17 of the lever 14.

Clamps 30 and 31 are secured to arms 6 and 7 respectively. Each of these clamps includes a lower clamping element 33 and an upper clamping element 34. The lower element is pivotally secured by a pin 35 to arm 6 or 7. The lower element is formed with a flat base 36 lying parallel to the arms 6 and 7 and with an upwardly extending lip 38 extending the length of its outer edge. Integrally formed with the lower clamping element 33 are a pair of parallel, upwardly extending trunnions 40 and 41, spaced apart to function as journals. Locking pin 43, secured in trunnions 40 and 41, passes through one end of upper clamping element 34 to pivotally secure it to lower clamping element 33. Upper clamping element 34 is an elongated, flattened member adapted to pivot in a plane normal to the base 36. The side 48 of element 34 falls adjacent to the inner surface of lip 38. The guide element 50 projects normally from base 36 and may be integrally formed with trunnion 40. This guide element projects above the upper surface of base 36 a sufficient distance to guide and locate the side edge of the belts being clamped together.

A latch or locking means 56 is provided at the end of each clamp. These latches are secured on flanges 57 normal to upper clamping elements 34 and preferably consist of a conventional loop 59 secured at one end to a pivoting link 60 in turn secured to bracket 61 riveted to flange 57 to 62. Loop 59 is designed to engage a hook 65 riveted at 66 to the end of lower clamping element 33.

A pin 70 extends through aligned openings in elements 33 and is fixedly secured to one of these elements, for example by setscrew 73 and is slidably engaged with the opposite clamping element 33 but provided with a peened head 71 to preclude the pin from slipping from interengagement with this element. Pin 70 permits the two clamps to move toward each other while yet preserving their parallel orientation. Pin 70 supports helical spring 74 that bears at opposite ends against flanges 76 projecting downwardly from elements 33, thus tending to separate the two clamping elements 30 and 31.

In operation, the two ends of a belt are passed through the clamping elements 30 and 31 with the belt sides 80 and 81 aligned adjacent to guides 50. The free ends of the belt are drawn together as closely as may be done conveniently under hand pressure and the upper clamp elements 34 are latched in place. The belt ends may still be spaced a distance of one-half inch or more. The operator then squeezes handles 9 and 11 causing arms 6 and 7 to pivot toward one another. Clamps 30 and 31 move toward one another in a parallel fashion guided by pin 70 and pivots 35. The handle is squeezed sufficiently to bring the free ends of the belts together so that a pin may be passed through the interengaged loops attached to the ends of the belts, thus joining the belt ends. Once the belt ends have been secured together, the handles may be released, the clamps opened, and the tool then returns to its normal open position under the tension of spring 74.

Other embodiments will occur to those skilled in the art and are within the following claims.

I claim:

1. At tool for mating the free ends of elongated objects comprising a pair of arms mounted for movement toward and away from one another, a clamp secured to each of said arms having clamping surfaces adapted to receive and transversely engage one of said free ends, manually actuated force-increasing means for moving together the portions of said arms to which said clamps are secured, said arms being pivoted about a common axis, said clamps being pivotally mounted to said arms, and further comprising a linking element extending between said clamps and adapted to prevent relative angular movement of one clamp with respect to the other.

2. The tool of claim 1 wherein said linking element is fixedly mounted to one of said clamps and slidably mounted to the other of said clamps.

3. A tool for mating free ends of elongated objects comprising a pair of arms mounted for movement toward and away from one another, a clamp secured to each of said arms having clamping surfaces adapted to receive and transversely engage one of said free ends, manually actuated force-increasing means for moving together the portions of said arms to which said clamps are secured, each clamp including guide means having a flat surface to locate and orient the edges of said flat elongated objects.

4. A tool for mating the free ends of elongated objects comprising a pair of arms pivoted about a common axis for relative movement toward and away from one another, a clamp pivotally mounted to each said arm having elongated clamping surfaces oriented perpendicular to the direction of relative movement of said clamps, a rod fixedly mounted to one of said clamps and passing through a cooperating hole in the other of said clamps to prevent relative angular movement of said clamps, spring means surrounding said rod and adapted to bias said clamps apart, force-increasing means for moving together the portions of said arms to which said clamps are pivoted adapted to be actuated by a singlehanded squeeze grip of two relatively movable lever means.